United States Patent
Jiang (10) Patent No.: US 11,937,130 B2
(45) Date of Patent: Mar. 19, 2024

(54) BANDWIDTH PART ADJUSTMENT METHOD AND BANDWIDTH PART ADJUSTMENT APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 549 days.

(21) Appl. No.: 17/268,862

(22) PCT Filed: Aug. 16, 2018

(86) PCT No.: PCT/CN2018/100870
§ 371 (c)(1),
(2) Date: Feb. 16, 2021

(87) PCT Pub. No.: WO2020/034159
PCT Pub. Date: Feb. 20, 2020

(65) Prior Publication Data
US 2021/0211941 A1    Jul. 8, 2021

(51) Int. Cl.
*H04W 28/20* (2009.01)
(52) U.S. Cl.
CPC ....... *H04W 28/20* (2013.01); *H04W 74/0833* (2013.01)
(58) Field of Classification Search
CPC ............. H04W 28/20; H04W 74/0833; H04W 72/0453; H04W 74/0866; H04W 72/23; H04L 5/0005; H04L 5/0098
See application file for complete search history.

(56) References Cited

U.S. PATENT DOCUMENTS

| | | | |
|---|---|---|---|
| 2009/0274120 | A1 | 11/2009 | Chou |
| 2011/0170462 | A1 | 7/2011 | Hao et al. |
| 2012/0026958 | A1 | 2/2012 | Chou |
| 2014/0328325 | A1 | 11/2014 | Bai et al. |

(Continued)

FOREIGN PATENT DOCUMENTS

| | | | |
|---|---|---|---|
| CN | 101577943 A | | 11/2009 |
| CN | 102625387 A | | 8/2012 |

(Continued)

OTHER PUBLICATIONS

First CNOA issued in Application No. 201880001756.4, , dated Sep. 19, 2022, with Machine English Translation, (12p).

(Continued)

*Primary Examiner* — Sudesh M Patidar
(74) *Attorney, Agent, or Firm* — Arch & Lake LLP (57) ABSTRACT

A method and apparatus for bandwidth part (BWP) adaptation are provided. The method may include determining, in response to receiving a BWP adapting instruction during a random access procedure, whether a BWP indicated by the BWP adapting instruction is the same as a target BWP in the random access procedure. The method may further include adapting, in response to that the BWP indicated by the BWP adapting instruction is not the same as the target BWP and in accordance with the BWP adapting instruction, the BWP indicated by the BWP adapting instruction, and continuing the random access procedure.

8 Claims, 4 Drawing Sheets

Determine whether a BWP indicated by a BWP adapting instruction is the same as a target BWP in a random access procedure if the BWP adapting instruction is received during the random access procedure  — S1

If the BWP indicated by the BWP adapting instruction is not the same as the target BWP, adapt the BWP indicated by the BWP adapting instruction in accordance with the BWP adapting instruction while the random access procedure is continued  — S2

If the BWP indicated by the BWP adapting instruction is the same as the target BWP in the random access procedure, select and perform one operation from one or more preset operations; where the preset operations include: determining a BWP, configured for the serving cell for the random access procedure, other than the BWP indicated by the BWP adapting instruction; stopping the random access procedure on the target BWP, initiating a random access procedure on the BWP, and adapting the target BWP in accordance with the BWP adapting instruction  — S3

(56) References Cited

U.S. PATENT DOCUMENTS

| | | | |
|---|---|---|---|
| 2018/0049068 A1 | 2/2018 | Agiwal et al. | |
| 2018/0103445 A1 | 4/2018 | Akkarakaran et al. | |
| 2019/0149421 A1* | 5/2019 | Jin | H04L 5/0078 370/331 |
| 2020/0337051 A1* | 10/2020 | Chang | H04W 74/0833 |
| 2020/0344732 A1* | 10/2020 | Li | H04W 74/006 |
| 2020/0374923 A1* | 11/2020 | Cheng | H04B 7/0626 |
| 2020/0389282 A1* | 12/2020 | Turtinen | H04W 74/02 |
| 2021/0167934 A1* | 6/2021 | Fan | H04L 5/0098 |
| 2021/0368545 A1* | 11/2021 | Xu | H04W 74/0833 |

FOREIGN PATENT DOCUMENTS

| | | |
|---|---|---|
| CN | 103167624 A | 6/2013 |
| CN | 103999528 A | 8/2014 |
| CN | 107688471 A | 2/2018 |
| CN | 107690173 A | 2/2018 |
| CN | 108012329 A | 5/2018 |
| CN | 108401526 A | 8/2018 |
| WO | 2018066923 A1 | 4/2018 |

OTHER PUBLICATIONS

INOA issued in Application No. 202147009729, , dated Feb. 1, 2022, with English Translation, (6p).

European Patent Office, Extended European Search Report Issued in Application No. 18930313.4, dated Jul. 30, 2021, Germany, 11 pages.

ISA State Intellectual Property Office of the People's Republic of China, Written Opinion of the International Searching Authority Issued in Application No. PCT/CN2018/100870, dated Apr. 29, 2019, WIPO, 8 pages.

LG Electronics Inc., "Summary of E-mail discussion on [99bis#43][NRUP/MAC] Impact of BWP", 3GPP TSG-RAN WG2 Meeting #100, R2-1713879, Reno, USA, Nov. 27-Dec. 1, 2017, 35 pages.

Huawei, HiSilicon, "Correction on BWP switching with onging RA",3GPP TSG-RAN WG2 Adhoc1807,R2-1810222, Montreal, Canada, Jul. 2-6, 2018, 5 pages.

International Search Report of PCT Application No. PCT/CN2018/100870 dated Apr. 29, 2019 with English translation (4p).

Nokia, Nokia Shanghai Bell, "Clarifications on BWP switch interaction with RA procedure", 3GPP TSG-RAN WG2 NR Ad hoc 1801, Vancouver, Canada, R2-1800962, Jan. 22-26, 2018, (4p).

3rd Generation Partnership Project, Technical Specification Group Radio Access Network; NR;Medium Access Control (MAC) protocol specification, 3GPP TS 38.321 V15.2.0, Jun. 30, 2018, (73p).

State Intellectual Property Office of the People's Republic of China, Office Action and Search Report Issued in Application No. 201880001756.4, dated Mar. 31, 2023, Submitted with Machine/Partial Translation, (15p).

Indian Patent Office, Office Action and Search Report Issued in Application No. 202147009729, dated Feb. 1, 2022. Submitted with Machine/Partial Translation, (6p).

Samsung Electronics, "Corrections for Handling BWP Switching Command received during RA Procedure", 3GPP TSG-RAN2 101bis, Sanya, China, Apr. 16-Apr. 20, 2018, R2-1804317, (4p).

Samsung Electronics, "Corrections on BWP Switching Upon Initiation of Random Access Procedure", 3GPP TSG-RAN2 102, Busan, South Korea, May 21-May 25, 2018, R2-1806818, (4p).

Xiaomi Communications, "Correction on BWP switching procedure", R2-1811121,3GPP TSG-RAN WG2 Meeting #103, Gothenburg, Sweden, Aug. 20-24, 2018, 5 pages.

Ericsson, "BWP and random access", R1-1721425, 3GPP TSG-RAN WG1 91, Reno, USA, Nov. 27-Dec. 1, 2017, 3 pages.

Samsung Electronics, "Corrections for Handling BWP Switching Command received during RA Procedure", R2-1801871, 3GPP TSG-RAN2 101, Athens, Greece, Feb. 26-Mar. 2, 2018, 3 pages.

Samsung, "Miscellaneous corrections", R2-1806229, 3GPP TSG-RAN WG2 Meeting #101bis, Sanya, China, Apr. 16-20, 2018, 68 pages.

* cited by examiner

BANDWIDTH PART ADJUSTMENT METHOD AND BANDWIDTH PART ADJUSTMENT APPARATUS

CROSS-REFERENCE TO RELATED APPLICATION

This application is the national phase of International Application No. PCT/CN2018/100870, filed on Aug. 16, 2018, the entire contents of which are incorporated herein by reference in its entirety for all purposes.

TECHNICAL FIELD

The present disclosure relates to the field of telecommunication technologies, and in particular, relates to methods of bandwidth part adaptation, apparatuses for bandwidth part adaptation, electronic devices and computer-readable storage media.

BACKGROUND

In a New Radio (NR) technology, a carrier bandwidth can be divided into a plurality of bandwidth parts (BWPs). A base station can adapt a BWP used by a user equipment by sending a BWP adapting instruction to the user equipment.

Considering that a random access procedure initiated by the user equipment is also BWP-based, the BWP indicated by the BWP adapting instruction may be the same as a BWP in the random access procedure, which may result in a conflict between a BWP adaptation operation and a random access operation.

In most of approaches adopted by the related art, it is to perform either of the above two operations to solve their conflict problem. By this way, the operation that is not selected has to suffer a latency, which results in limited applicable scenarios and difficult business expansion.

SUMMARY

The present disclosure provides methods of bandwidth part (BWP) adaptation, apparatuses for BWP adaptation, electronic devices and computer-readable storage media.

According to a first aspect of the present disclosure, a method of BWP adaptation is provided. The method may include determining, in response to receiving a BWP adapting instruction during a random access procedure, whether a BWP indicated by the BWP adapting instruction is the same as a target BWP in the random access procedure. The method may further include adapting, in response to that the BWP indicated by the BWP adapting instruction is not the same as the target BWP and in accordance with the BWP adapting instruction, the BWP indicated by the BWP adapting instruction, and continuing the random access procedure.

According to a second aspect of the present disclosure, an electronic device is provided. The electronic device may include one or more processors and a non-transitory computer-readable medium for storing instructions executable by the one or more processors. The one or more processors may be configured to determine, in response to receiving a BWP adapting instruction during a random access procedure, whether a BWP indicated by the BWP adapting instruction is the same as a target BWP in the random access procedure. The one or more processors may be configured to adapt, in response to the BWP indicated by the BWP adapting instruction is not the same as the target BWP and in accordance with the BWP adapting instruction, the BWP indicated by the BWP adapting instruction, and continue the random access procedure.

It should be understood that the above general descriptions and detailed descriptions below are only examples and explanatory and not intended to limit the present disclosure.

BRIEF DESCRIPTION OF THE DRAWINGS

The accompanying drawings related to the description of the examples will be briefly introduced to explain the technical solutions provided by the embodiments of the present disclosure more clearly. It is obvious that, the drawings in the following description illustrate only some examples of the present disclosure, and based on these drawings, those of ordinary skill in the art may obtain other drawings without creative work.

DETAILED DESCRIPTION

The following, in conjunction with the drawings of the examples of the present disclosure, will clearly and completely describe the technical solutions provided in the embodiments of the present disclosure. It is obvious that the described examples are partial examples, not all implementations of the present disclosure. Based on the examples provided in the present disclosure, all of other examples, which can be obtained by those of ordinary skill in the art without creative work, shall fall within the protection scope of this application.

Figure 1:
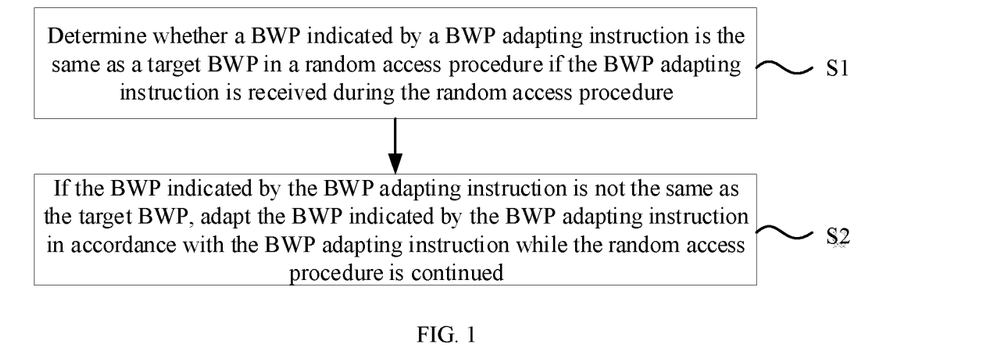
FIG. 1 is a schematic flowchart illustrating a method of BWP adaptation according to an example of the present disclosure.

FIG. 1 is a schematic flowchart illustrating a method of BWP adaptation according to an example of the present disclosure. The method of BWP adaptation illustrated in the example may be applied to a user equipment. The user equipment may be an electronic device, such as a mobile phone, a tablet and a wearable device, and may communicate with a base station, for example, based on an NR technology.

As illustrated in FIG. 1, the method of BWP adaptation may include the following steps:

at step S1, it is determined whether a BWP indicated by a BWP adapting instruction is the same as a target BWP in a random access procedure if the BWP adapting instruction is received during the random access procedure; and at step S2, if the BWP indicated by the BWP adapting instruction is not the same as the target BWP, the BWP indicated by the BWP adapting instruction is adapted in accordance with the BWP adapting instruction while the random access procedure is continued.

In an example, before continuing the random access procedure, it may be determined whether the random access procedure has been successfully completed. It may be determined whether the random access procedure has been successfully completed, for example, based on a received physical downlink control channel (PDCCH) message that may include the BWP adapting instruction.

It is to continue the random access procedure if the random access procedure is not successfully completed; otherwise it is not to continue the random access procedure.

In an example, if receiving the BWP adapting instruction during the random access procedure, the user equipment may determine whether the BWP indicated by the BWP adapting instruction is the same as the target BWP in the random access procedure. The target BWP in the random access procedure may include a BWP on which one or more random access messages transmit between the user equipment and the base station are located, where the random access messages include random access message 1 (MSG1), random access message 2 (MSG2), random access message 3 (MSG3), and random access message 4 (MSG4).

The user equipment may receive the BWP adapting instruction in a serving cell for the random access procedure. The serving cell may be configured with a plurality of BWPs, and the BWP adapting instruction indicates one or more BWPs among the plurality of BWPs.

In the related art, if receiving the BWP adapting instruction during the random access procedure, the user equipment may select to ignore the BWP adapting instruction, or select to: stop the random access procedure, adapt the BWP, and re-initiate the stopped random access procedure after the BWP is adapted. No matter which operation is selected, only either the random access procedure or the BWP adaptation can be performed at the same time, that is, the random access procedure and the BWP adaptation cannot be performed simultaneously. For example, it causes a latency of the BWP adaptation if the random access procedure is selected, and causes a latency of the random access procedure if the BWP adaptation is selected. Therefore, for some services requiring low latency, such as a Ultra Reliable & Low Latency Communication (URLLC) service, it may be difficult to meet their latency requirement.

According to the examples of the present disclosure, in the case that a BWP indicated by a BWP adapting instruction is not the same as a target BWP, adapting the BWP indicated by the BWP adapting instruction does not affect a random access procedure on the target BWP. Therefore, the BWP indicated by the BWP adapting instruction can be adapted in accordance with the BWP adapting instruction, while the random access procedure can be continued, so that the BWP adaptation and the random access procedure can be performed simultaneously. Thus, it can avoid from a latency of the BWP adaptation or the random access procedure, and ensure that both operations can be completed in time, which is convenient to be applied for more business requirements.

Figure 2:
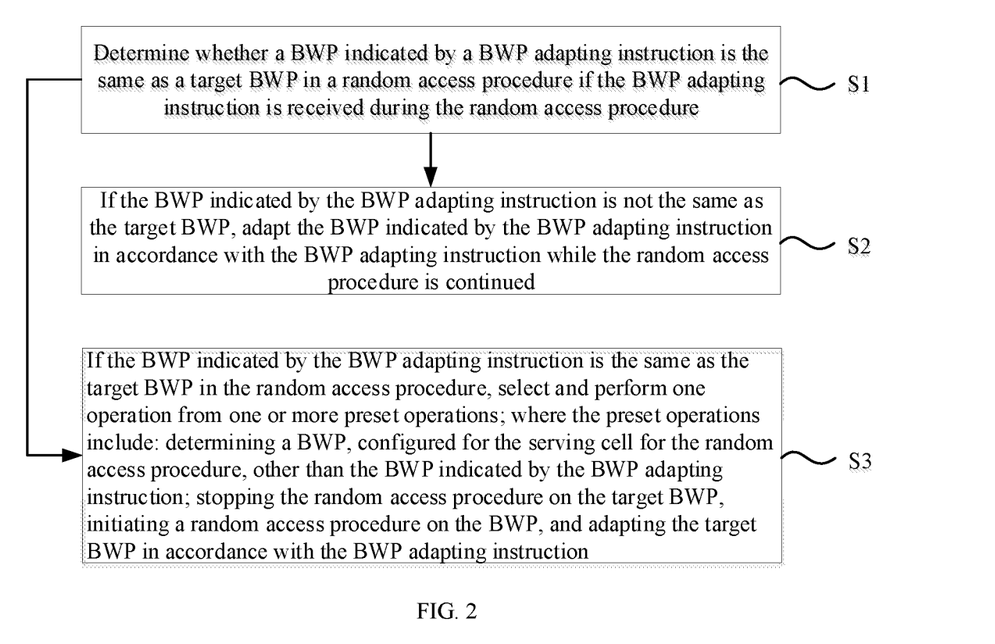
FIG. 2 is a schematic flowchart illustrating another method of BWP adaptation according to an example of the present disclosure.

FIG. 2 is a schematic flowchart illustrating another method of BWP adaptation according to an example of the present disclosure. As illustrated in FIG. 2, on the basis of the example shown in FIG. 1, the method further includes:
at step S3, if the BWP indicated by the BWP adapting instruction is the same as the target BWP in the random access procedure, one operation is selected from one or more preset operations and is performed; where the preset operations include:
determining a BWP, configured for the serving cell for the random access procedure, other than the BWP indicated by the BWP adapting instruction;
stopping the random access procedure on the target BWP, initiating a random access procedure on the BWP, and adapting the target BWP in accordance with the BWP adapting instruction.

In an example, if the BWP indicated by the BWP adapting instruction is the same as the target BWP in the random access procedure, adapting the BWP indicated by the BWP adapting instruction may affect the random access procedure on the target BWP. In order to avoid this problem, one operation may be selected from the one or more preset operations and be performed.

The selected preset operation may include: determining a BWP, configured for the serving cell for the random access procedure, other than the BWP indicated by the BWP adapting instruction, and then stopping the random access procedure on the target BWP and initiating a random access procedure on the BWP, and adapting the target BWP in accordance with the BWP adapting instruction. Thus, it can be guaranteed that the target BWP is adapted in accordance with the BWP adapting instruction, so that the BWP adapting instruction can be executed successfully. Meanwhile, it can initiate the random access procedure on the BWP, so that the BWP adaptation and the random access procedure can be performed simultaneously. Therefore, it can avoid from a latency of the BWP adaptation or the random access procedure, and ensure that both operations can be completed in time, which is convenient to be applied for more business requirements.

In an example, the serving cell for the random access procedure includes:
a cell on which a random access message for the random access procedure is received or sent.

In an example, the random access messages for a contention-based random access procedure may include MSG1, MSG2, MSG3, and MSG4, while the random access messages for a contention-free random access procedure may include MSG1 and MSG2.

For example, in the case that the contention-based random access procedure is initiated on a special cell (SpCell), which refers to a primary cell or a primary secondary cell as the serving cell, MSG1, MSG2, MSG3, and MSG4 are all sent and received on the SpCell. Thus, the random access messages for the random access procedure may be received and sent only on the SpCell.

For example, in the case that the contention-free random access procedure is initiated on a non-special cell, also known as a secondary cell (SCell), which refers to a serving cell other than the primary cell or the primary secondary cell, MSG1 is sent on the SCell and MSG2 is received on the SpCell. Thus, the random access messages for the random access procedure may be received and sent on the SCell and the SpCell.

It should be noted that initiating the random access procedure on a certain cell refers to sending MSG1 on the cell.

In an example, the BWP belongs to a plurality of active BWPs that are configured for the serving cell for the random access procedure.

In an example, the serving cell may be configured with the plurality of active BWPs. In this case, the serving cell may be configured with a plurality of carriers, with each carrier configured with one respective active BWP.

On the basis of the example illustrated in FIG. 2, the target BWP and the BWP for initiating the random access procedure may belong to the active BWPs. Therefore, when the random access procedure on the target BWP is stopped, the random access procedure on the BWP can be directly initiated without performing operations such as being activated, which is helpful to reduce the latency caused by initiating the random access procedure on the BWP.

It should be noted that the BWP may also be an inactive BWP. In this case, the BWP has to be activated before the random access procedure is initiated on it.

In an example, the preset operations further include:
 ignoring the BWP adapting instruction.

In an example, the preset operations further include:
 stopping the random access procedure on the target BWP, adapting the target BWP in accordance with the BWP adapting instruction, and initiating the random access procedure on the adapted BWP.

For convenience of description, the operations in the example illustrated in FIG. 2 are called as Operation 1, Operation 2, and Operation 3, respectively. The Operation 1 refers to the operation of determining the BWP, configured for the serving cell for the random access procedure, other than the BWP indicated by the BWP adapting instruction, stopping the random access procedure on the target BWP, initiating the random access procedure on the BWP, and adapting the target BWP in accordance with the BWP adapting instruction; the Operation 2 refers to the operation of ignoring the BWP adapting instruction; and the Operation 3 refers to the operation of stopping the random access procedure on the target BWP, adapting the target BWP in accordance with the BWP adapting instruction, and initiating the random access procedure on the adapted BWP.

In an example, on the basis of the example illustrated in FIG. 2, in the case that the BWP indicated by the BWP adapting instruction is the same as the target BWP in the random access procedure, in order to avoid the problem that adapting the BWP indicated by the BWP adapting instruction affects the random access procedure on the target BWP, it may select and perform either the Operation 1 or the Operation 2, or select and perform either the Operation 1 or the Operation 3, or select and perform one operation from the Operation 1, the Operation 2 and the Operation 3.

In an example, the BWP adapting instruction includes at least one of:
 a BWP switching instruction, or a BWP deactivating instruction.

In an example, the BWP adapting instruction may specifically be the BWP switching instruction, or the BWP deactivating instruction.

Figure 3:
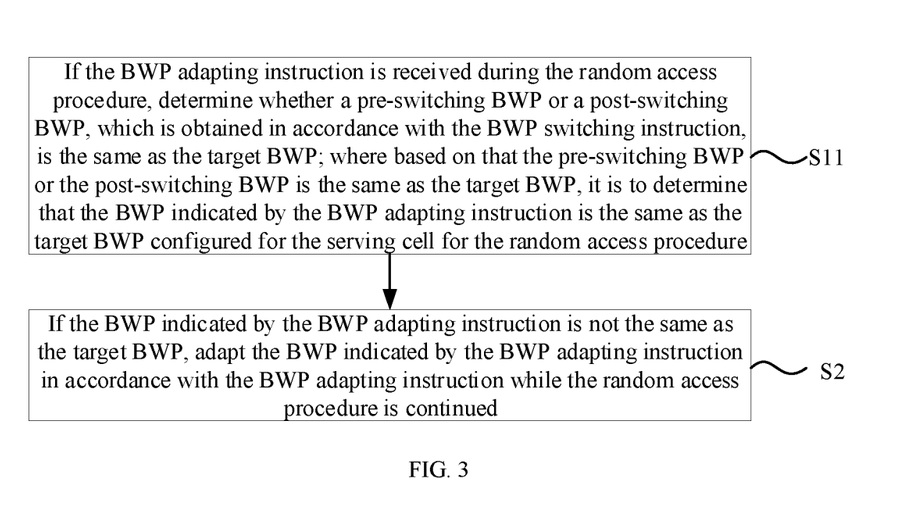
FIG. 3 is a schematic flowchart illustrating another method of BWP adaptation according to an example of the present disclosure.

FIG. 3 is a schematic flowchart illustrating another method of BWP adaptation according to an example of the present disclosure. As illustrated in FIG. 3, on the basis of the example illustrated in FIG. 1, if the BWP adapting instruction includes the BWP switching instruction, determining whether the BWP indicated by the BWP adapting instruction is the same as the target BWP in the random access procedure includes:
 at step S11, it is determined whether a pre-switching BWP or a post-switching BWP, which is obtained in accordance with the BWP switching instruction, is the same as the target BWP;
 where based on that the pre-switching BWP or the post-switching BWP is the same as the target BWP, it is to determine that the BWP indicated by the BWP adapting instruction is the same as the target BWP in the random access procedure.

In an example, if the BWP adapting instruction includes the BWP switching instruction, since the BWP switching instruction is configured to switch from one BWP to another BWP, the BWP switching instruction involves the pre-switching BWP and the post-switching BWP. Therefore, if the target BWP is the same as the pre-switching BWP or the post-switching BWP, it can be determined that the BWP indicated by the BWP adapting instruction is the same as the target BWP in the random access procedure.

Figure 4:
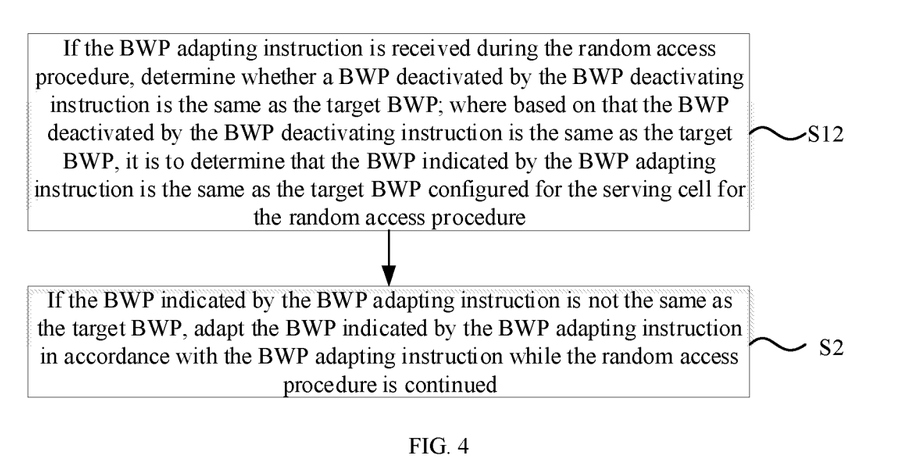
FIG. 4 is a schematic flowchart illustrating another method of BWP adaptation according to an example of the present disclosure.

FIG. 4 is a schematic flowchart illustrating another method of BWP adaptation according to an example of the present disclosure. As illustrated in FIG. 4, on the basis of the example illustrated in FIG. 1, if the BWP adapting instruction includes the BWP deactivating instruction, determining whether the BWP indicated by the BWP adapting instruction is the same as the target BWP in the random access procedure includes:
 at step S12, it is determined whether a BWP deactivated by the BWP deactivating instruction is the same as the target BWP;
 where based on that the BWP deactivated by the BWP deactivating instruction is the same as the target BWP, it is to determine that the BWP indicated by the BWP adapting instruction is the same as the target BWP in the random access procedure.

In an example, if the BWP adapting instruction includes the BWP deactivating instruction, since the BWP deactivating instruction is configured to deactivate an active BWP, i.e., to set the BWP from being active to being inactive, the BWP deactivating instruction only involves the BWP to be deactivated. Therefore, if the target BWP is the same as the deactivated BWP, it can be determined that the BWP indicated by the BWP adapting instruction is the same as the target BWP in the random access procedure.

In an example, the target BWP includes:
 a BWP on which a random access message for the random access procedure is received or sent.

In an example, an uplink BWP is configured for sending a random access message and a downlink BWP is configured for receiving a random access message, so the random access messages for the random access procedure may be sent and received on the uplink BWP and the downlink BWP.

For example, SpCell is the serving cell for random access procedure. For a contention-based random access procedure initiated on the SpCell, the target BWPs may include the uplink BWP configured for sending MSG1 and MSG3 on the SpCell, and the downlink BWP configured for receiving MSG2 and MSG4 on the SpCell.

For example, SCell is the serving cell for random access procedure. For a contention-based random access procedure initiated on the SCell, the target BWPs may include the uplink BWP configured for sending MSG1 and MSG3 on the SCell, and the downlink BWP configured for receiving MSG2 and MSG4 on the SCell.

It should be noted that in some cases, the user equipment is configured to attempt to send MSG1 or MSG3 on a plurality of uplink BWPs, but finally may send MSG1 or MSG3 only on one uplink BWP. In such cases, the target BWPs include the plurality of uplink BWPs.

Similarly, if the user equipment is configured to attempt to receive MSG2 or MSG4 on a plurality of downlink BWPs, but finally may receive MSG2 or MSG4 only on one downlink BWP. In such cases, the target BWPs include the plurality of downlink BWPs.

In addition, for unpaired spectrum, i.e., spectrum based on time division duplex (TDD), whose uplink BWP and downlink BWP are on one carrier, the uplink BWP and the downlink BWP are the same BWP. If the random access message is received on the downlink BWP of the unpaired spectrum, the target BWPs include the uplink BWP and the downlink BWP of the unpaired spectrum. If the random access message is sent on the uplink BWP of the unpaired spectrum, the target BWPs include the uplink BWP and the downlink BWP of the unpaired spectrum.

The random access procedure is affected by adapting any one BWP on which the random access message for the random access procedure is sent and by adapting any one BWP on which the random access message for the random access procedure is received. Therefore, when any one BWP that affects the random access procedure, i.e., any one BWP on which the random access message for the random access procedure may be received or sent, is expected to be adapted in accordance with the BWP adapting instruction, it makes sure to perform the operations according to the example illustrated in FIG. 1 or FIG. 2, which avoids from a latency of the BWP adaptation or the random access procedure to the greatest extent.

Corresponding to the foregoing method examples of BWP adaptation, the present disclosure also provides apparatus examples for BWP adaptation.

Figure 5:
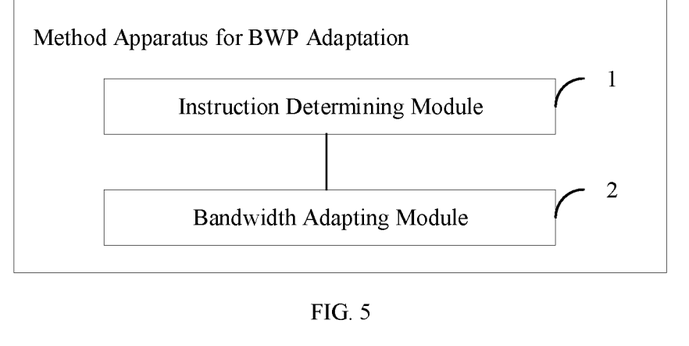
FIG. 5 is a schematic block diagram illustrating an apparatus for BWP adaptation according to an example of the present disclosure.

FIG. 5 is a schematic block diagram illustrating an apparatus for BWP adaptation according to an example of the present disclosure. The apparatus for BWP adaptation illustrated in the example may be applied to a user equipment. The user equipment may be an electronic device, such as a mobile phone, a tablet and a wearable device, and may communicate with a base station, for example, based on an NR technology.

As illustrated in FIG. 5, the apparatus for BWP adaptation includes:
an instruction determining module 1, configured to determine whether a BWP indicated by a BWP adapting instruction is the same as a target BWP in a random access procedure if the BWP adapting instruction is received during the random access procedure; and
a bandwidth adapting module 2, configured to in the case that the BWP indicated by the BWP adapting instruction is not the same as the target BWP, adapt, in accordance with the BWP adapting instruction, the BWP indicated by the BWP adapting instruction, and continue the random access procedure.

Figure 6:
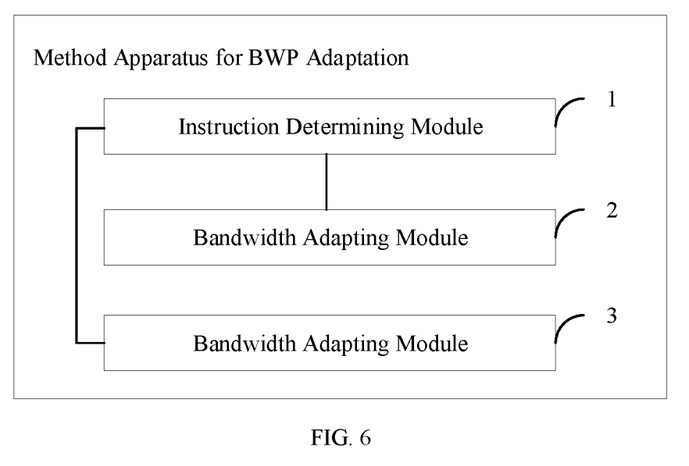
FIG. 6 is a schematic block diagram illustrating another apparatus for BWP adaptation according to an example of the present disclosure.

FIG. 6 is a schematic block diagram illustrating another apparatus for BWP adaptation according to an example of the present disclosure. As illustrated in FIG. 6, on the basis of the example shown in FIG. 5, the apparatus for BWP adaptation further includes:
an operation selecting module 3, configured to in the case that the BWP indicated by the BWP adapting instruction is the same as the target BWP in the random access procedure, select and perform one of one or more preset operations; where the preset operations include:
determining a BWP, configured for a serving cell for the random access procedure, other than the BWP indicated by the BWP adapting instruction;
stopping the random access procedure on the target BWP, initiating a random access procedure on the BWP, and adapting the target BWP in accordance with the BWP adapting instruction.

In an example, the BWP belongs to a plurality of active BWPs that are configured for the serving cell for the random access procedure.

In an example, the serving cell for the random access procedure includes:
a cell on which a random access message for the random access procedure is received or sent.

In an example, the preset operations further include:
ignoring the BWP adapting instruction.

In an example, the preset operations further include:
stopping the random access procedure on the target BWP, adapting the target BWP in accordance with the BWP adapting instruction, and initiating the random access procedure on the adapted BWP.

In an example, the BWP adapting instruction includes at least one of:
a BWP switching instruction, or a BWP deactivating instruction.

In an example, when the BWP adapting instruction includes the BWP switching instruction, the instruction determining module is configured to determine whether a pre-switching BWP or a post-switching BWP, which is obtained in accordance with the BWP switching instruction, is the same as the target BWP;
where based on that the pre-switching BWP or the post-switching BWP is the same as the target BWP, it is to determine that the BWP indicated by the BWP adapting instruction is the same as the target BWP in the random access procedure.

In an example, when the BWP adapting instruction includes the BWP deactivating instruction, the instruction determining module is configured to determine whether a BWP deactivated by the BWP deactivating instruction is the same as the target BWP;
where based on that the BWP deactivated by the BWP deactivating instruction is the same as the target BWP, it is to determine that the BWP indicated by the BWP adapting instruction is the same as the target BWP in the random access procedure.

In an example, the target BWP includes:
a BWP on which a random access message for the random access procedure is received or sent.

Regarding the apparatus in the foregoing examples, the specific manner in which each module performs its operation has been described in detail in the examples of the related method, and will not be repeated here.

Since the apparatus examples essentially correspond to the method examples, reference may be made to the description of related parts of the method examples. The apparatus examples described above are merely illustrative, where the units described as separate members may be or not be physically separated, and the members displayed as units may be or not be physical units, i.e., may be located in one place, or may be distributed to a plurality of network units. Some or all of the modules may be selected according to actual needs to achieve the objectives of the implementations of the examples. It can be understood and implemented by those of ordinary skill in the art without any creative effort.

According to an example of the present disclosure, it is also provided an electronic device, including:
one or more processors; and
a memory for storing instructions executable by the one or more processors.

The one or more processors are configured to perform the steps of the method described in any one of the foregoing examples.

According to an example of the present disclosure, it is also provided a computer-readable storage medium having a computer program stored thereon. When the program is executed by a processor, the steps of the method described in any one of the foregoing examples are implemented.

Figure 7:
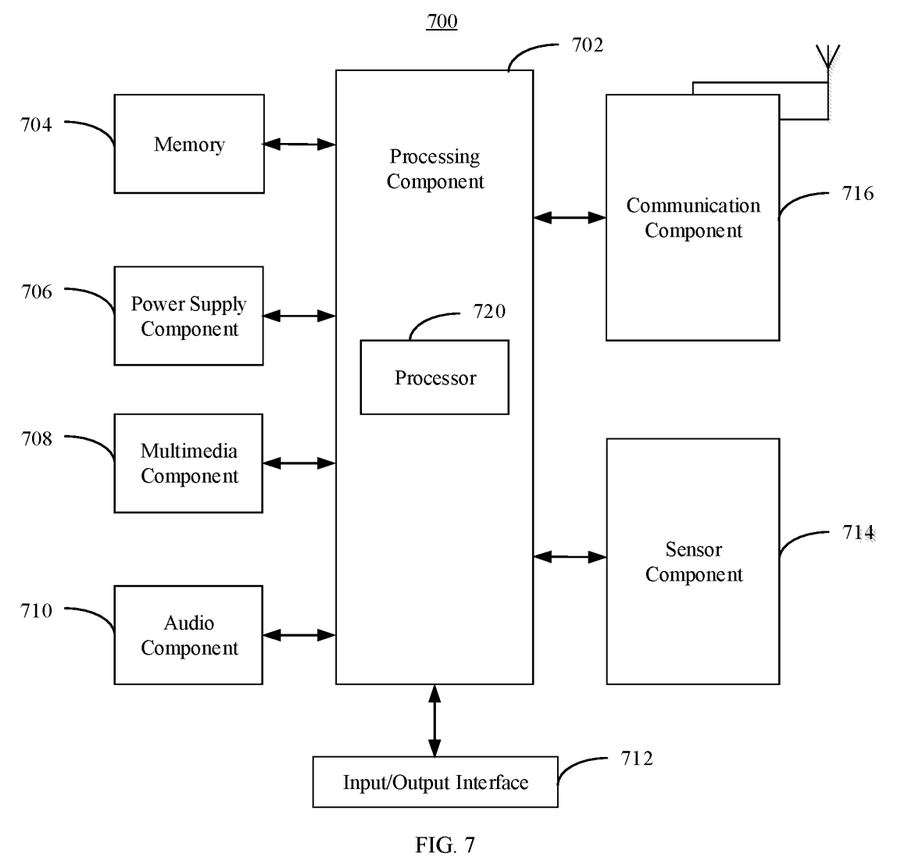
FIG. 7 is a schematic block diagram illustrating a BWP adaptation device according to an example of the present disclosure.

FIG. 7 is a schematic block diagram illustrating a BWP adaptation device according to an example of the present disclosure. For example, the device 700 may be a mobile phone, a computer, a digital broadcasting terminal, a messaging device, a game console, a tablet device, a medical device, a fitness device, a personal digital assistant, and the like.

As illustrated in FIG. 7, the device 700 may include one or more of the following components: a processing component 702, a memory 704, a power supply component 706, a multimedia component 708, an audio component 710, an input/output (I/O) interface 712, a sensor component 714, and a communication component 716.

The processing component 702 generally controls the overall operations of the device 700, such as operations associated with display, phone calls, data communications, camera operations, and recording operations. The processing element 702 may include one or more processors 720 to execute instructions to complete all or part of the steps of the above method. In addition, the processing component 702 may include one or more modules which facilitate the interaction between the processing component 702 and other components. For example, the processing component 702 may include a multimedia module to facilitate the interaction between the multimedia component 708 and the processing component 702.

The memory 704 is configured to store various types of data to support the operation of the device 700. Examples of such data include instructions for any application or method operated on the device 700, contact data, phonebook data, messages, pictures, videos, and the like. The memory 704 can be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

The power supply component 706 provides power to different components of the device 700. The power supply component 706 may include a power management system, one or more power supplies, and other components associated with generating, managing, and distributing power for the device 700.

The multimedia component 708 includes a screen providing an output interface between the device 700 and a user. In some examples, the screen can include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 708 includes a front camera and/or a rear camera. The front camera and/or rear camera may receive external multimedia data when the device 700 is in an operating mode, such as a photographing mode or a video mode. Each front camera and rear camera may be a fixed optical lens system or have focal length and optical zooming capability.

The audio component 710 is configured to output and/or input an audio signal. For example, the audio component 710 includes a microphone (MIC) that is configured to receive an external audio signal when the device 700 is in an operating mode, such as a call mode, a recording mode, and a voice recognition mode. The received audio signal may be further stored in the memory 704 or sent via the communication component 716. In some examples, the audio component 710 also includes a speaker for outputting an audio signal.

The I/O interface 712 provides an interface between the processing component 702 and a peripheral interface module. The above peripheral interface module may be a keyboard, a click wheel, buttons, or the like. These buttons may include but not limited to, a home button, a volume button, a start button and a lock button.

The sensor component 714 includes one or more sensors to provide the device 700 with status assessments in various aspects. For example, the sensor component 714 may detect an open/closed state of the device 700 and a relative positioning of components such as the display and keypad of the device 700, and the sensor component 714 may also detect a change in position of the device 700 or a component of the device 700, the presence or absence of user contact with the device 700, orientation or acceleration/deceleration of the device 700, and temperature change of the device 700. The sensor component 714 may include a proximity sensor configured to detect the presence of a nearby object without any physical contact. The sensor component 714 may further include an optical sensor, such as a Complementary Metal-Oxide-Semiconductor (CMOS) or Charged Coupled Device (CCD) image sensor which is used in imaging applications. In some examples, the sensor component 714 can also include an acceleration sensor, a gyro sensor, a magnetic sensor, a pressure sensor, or a temperature sensor.

The communication component 716 is configured to facilitate wired or wireless communication between the device 700 and other devices. The device 700 may access a wireless network based on a communication standard, such as WiFi, 2G or 3G, or a combination thereof. In an example, the communication component 716 receives broadcast signals or broadcast related information from an external broadcast management system via a broadcast channel. In an example, the communication component 716 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In an example, the device 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the method described in any one of the above examples.

In an example, there is also provided a non-transitory computer-readable storage medium including instructions, such as the memory 704 including instructions. The above instructions may be executed by the processor 720 of the device 700 to complete the above methods. For example, the non-transitory computer-readable storage medium may be a Read-Only Memory (ROM), a Random Access Memory (RAM), a CD-ROM, a magnetic tape, a floppy disk, an optical data storage device, and the like.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

According to the embodiments of the present disclosure, in the case that a BWP indicated by a BWP adapting instruction is not the same as a target BWP, adapting the BWP indicated by the BWP adapting instruction does not affect a random access procedure on the target BWP. Therefore, the BWP indicated by the BWP adapting instruction can be adapted in accordance with the BWP adapting instruction, while the ongoing random access procedure can be kept, so that the BWP adaptation and the random access procedure can be performed simultaneously. Thus, it can avoid from a latency of the BWP adaptation or the random access procedure, and ensure that both operations can be completed in time, which is convenient to be applied for more business requirements.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the element.

The method and apparatus provided by the examples of the present disclosure are described in detail above. Specific examples are used in this disclosure to illustrate the principle and the implementations of the present disclosure. The description of the above examples is only used to help understand the methods and its core idea of the present disclosure. Moreover, those skilled in the art can change both the specific implementations and the application scope according to the idea of the present disclosure. In summary, the content of this specification should not be construed as a limitation to the present disclosure.

What is claimed is:

1. A method of bandwidth part (BWP) adaptation comprising:
   during an ongoing random access procedure:
   determining, in response to receiving a BWP adapting instruction, whether a BWP indicated by the BWP adapting instruction is the same as a target BWP on which a random access message for the random access procedure is received or sent, wherein the target BWP is a current active BWP configured with PRACH occasion, or the target BWP is an initial BWP and the current active BWP is not configured with PRACH occasion;
   adapting, in response to the determining that the BWP indicated by the BWP adapting instruction is not the same as the target BWP and in accordance with the BWP adapting instruction, the BWP indicated by the BWP adapting instruction, and meanwhile continuing the random access procedure on the target BWP; and
   selecting and performing, in response to that the BWP indicated by the BWP adapting instruction is the same as the target BWP, one of one or more preset operations;
   wherein the one of the one or more preset operations comprises: determining a BWP, configured for a serving cell for the random access procedure, other than the BWP indicated by the BWP adapting instruction; stopping the random access procedure on the target BWP; initiating the random access procedure on the BWP; and adapting the target BWP in accordance with the BWP adapting instruction;
   or the one of the one or more preset operations comprises: stopping the random access procedure on the target BWP, adapting the target BWP in accordance with the BWP adapting instruction, and initiating the random access procedure on the target BWP that has been adapted;
   or the one of the one or more preset operations comprises: ignoring the BWP adapting instruction;
   wherein the BWP adapting instruction comprises at least one of a BWP switching instruction or a BWP deactivating instruction, and when the BWP adapting instruction comprises the BWP switching instruction, it is determined based on that a pre-switching BWP or a post-switching BWP indicated by the BWP switching instruction is the same as the target BWP.

2. The method according to claim 1, wherein the BWP belongs to a plurality of active uplink BWPs that are configured for the serving cell for the random access procedure.

3. The method according to claim 1, wherein the serving cell for the random access procedure comprises:
   a cell on which the random access message for the random access procedure is received or sent.

4. The method according to claim 1, wherein determining whether the BWP indicated by the BWP adapting instruction is the same as the target BWP comprises:
   determining, when the BWP adapting instruction comprises the BWP deactivating instruction, whether a BWP deactivated by the BWP deactivating instruction is the same as the target BWP;
   wherein it is determined based on that the BWP deactivated by the BWP deactivating instruction is the same as the target BWP.

5. An electronic device, comprising:
   one or more processors; and
   a tangible non-transitory computer-readable storage medium for storing instructions executable by the one or more processors;
   wherein the one or more processors are configured to:
   during an ongoing random access procedure:
   determine, in response to receiving a bandwidth part (BWP) adapting instruction, whether a BWP indicated by the BWP adapting instruction is the same as a target BWP on which a random access message for the random access procedure is received or sent, wherein the target BWP is a current active BWP configured with PRACH occasion, or the target BWP is an initial BWP and the current active BWP is not configured with PRACH occasion;

adapt, in response to the determining that the BWP indicated by the BWP adapting instruction is not the same as the target BWP and in accordance with the BWP adapting instruction, the BWP indicated by the BWP adapting instruction, and meanwhile continue the random access procedure on the target BWP; and select and perform, in response to that the BWP indicated by the BWP adapting instruction is the same as the target BWP, one of one or more preset operations;

wherein the one of the one or more preset operations comprises: determining a BWP, configured for a serving cell for the random access procedure, other than the BWP indicated by the BWP adapting instruction; stopping the random access procedure on the target BWP; initiating the random access procedure on the BWP; and adapting the target BWP in accordance with the BWP adapting instruction;

or the one of the one or more preset operations comprises: stopping the random access procedure on the target BWP, adapting the target BWP in accordance with the BWP adapting instruction, and initiating the random access procedure on the target BWP that has been adapted;

or the one of the one or more preset operations comprises: ignoring the BWP adapting instruction;

wherein the BWP adapting instruction comprises at least one of a BWP switching instruction, or a BWP deactivating instruction and when the BWP adapting instruction comprises the BWP switching instruction, it is determined based on that a pre-switching BWP or a post-switching BWP indicated by the BWP switching instruction is the same as the target BWP.

6. The electronic device according to claim 5, wherein the BWP belongs to a plurality of active uplink BWPs that are configured for the serving cell for the random access procedure.

7. The electronic device according to claim 5, wherein the serving cell for the random access procedure comprises:
a cell on which the random access message for the random access procedure is received or sent.

8. The electronic device according to claim 5, wherein the one or more processors configured to determine whether the BWP indicated by the BWP adapting instruction is the same as the target BWP are further configured to:
determine, when the BWP adapting instruction comprises the BWP deactivating instruction, whether a BWP deactivated by the BWP deactivating instruction is the same as the target BWP;
wherein it is determined based on that the BWP deactivated by the BWP deactivating instruction is the same as the target BWP.

* * * * *